Sept. 7, 1948.    R. A. CLAPP    2,448,519
INTERMITTENT FILM FEED MECHANISM
Filed July 19, 1944    2 Sheets-Sheet 2
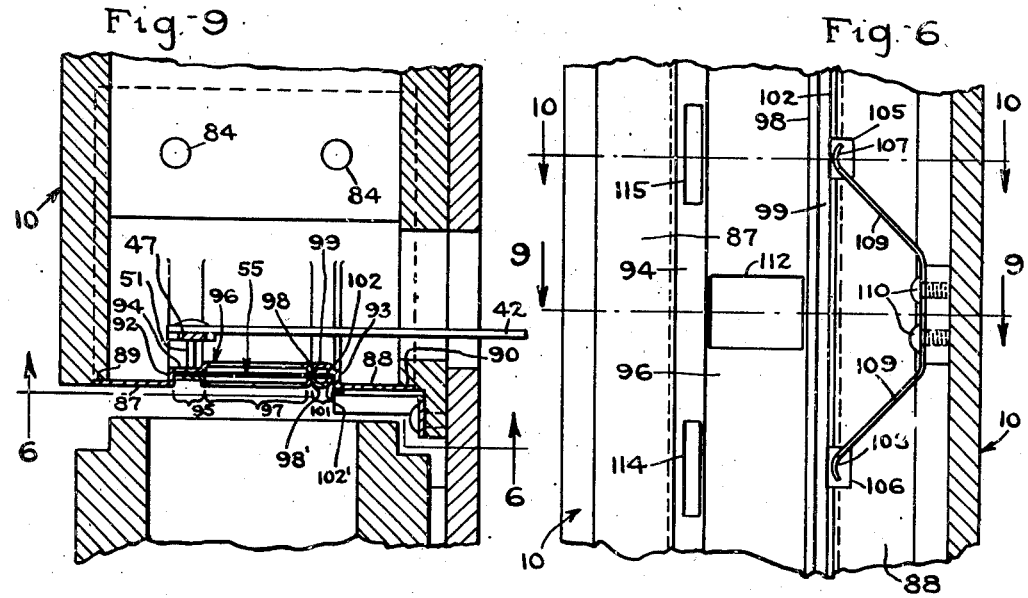
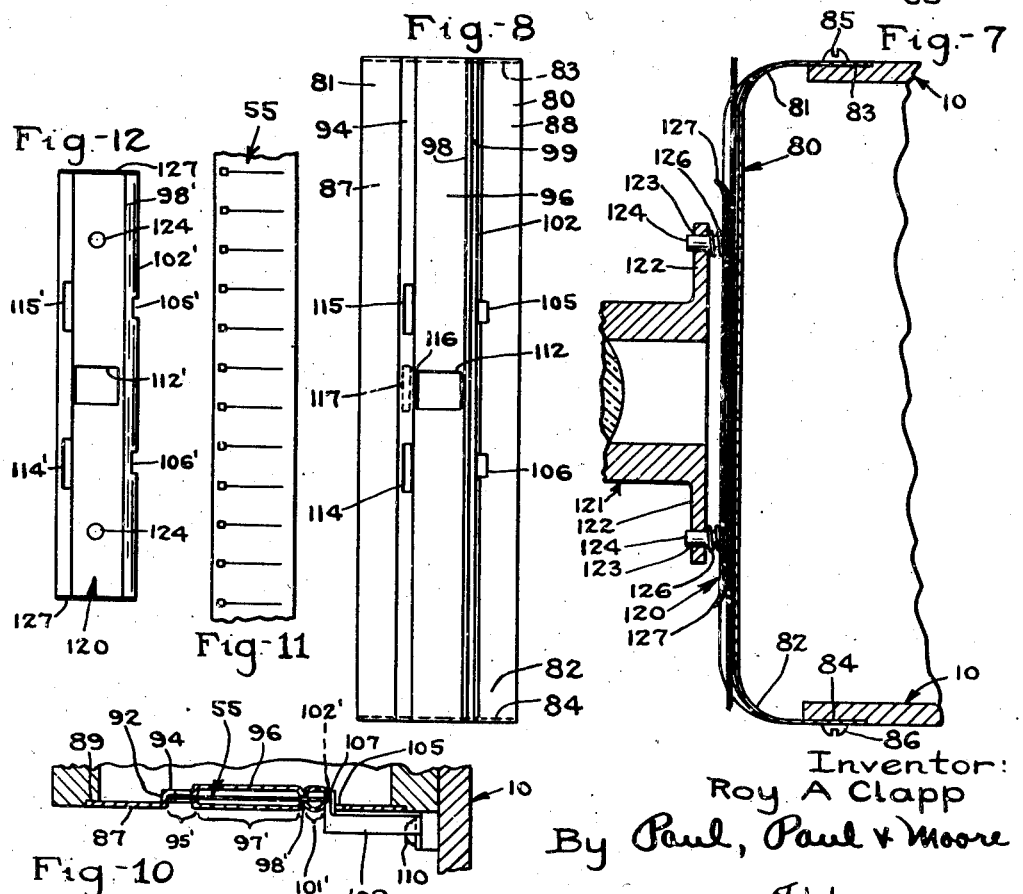
Inventor:
Roy A Clapp
By Paul, Paul & Moore
Attorneys Patented Sept. 7, 1948

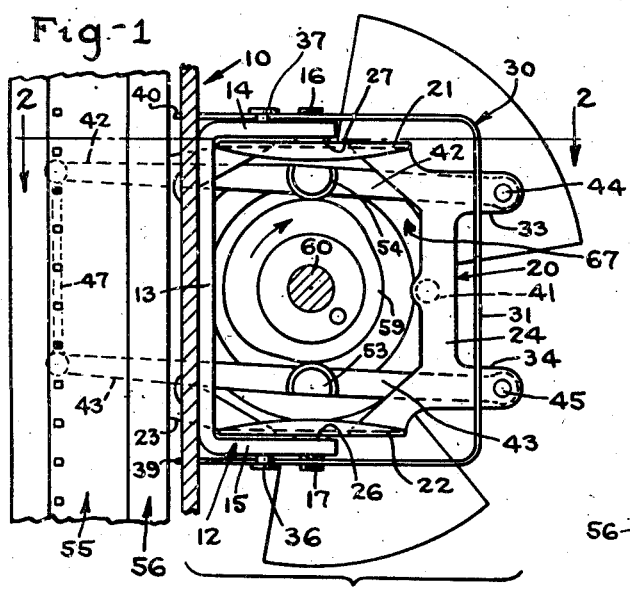

2,448,519

UNITED STATES PATENT OFFICE 2,448,519

INTERMITTENT FILM FEED MECHANISM

Roy A. Clapp, Minneapolis, Minn., assignor, by mesne assignments, to Argus, Incorporated, Ann Arbor, Mich., a corporation of Michigan Application July 19, 1944, Serial No. 545,624

2 Claims. (Cl. 88—18.4)

This invention relates to motion picture projecting apparatus wherein an evenly perforated film bearing evenly spaced image frames thereon is progressed through a projector apparatus in a step-by-step motion for the projection of the image frames. For the purpose of advancing the film step-by-step, the projector apparatus includes a film guide and in prior mechanisms of this type the film guides have been subject to breakage and excessive wear due to the relatively close spacing of the light aperture and slots therein, which, as heretofore made, have tended to weaken the film guide.

It is an object of the present invention to provide an improved projecting apparatus and particularly to provide an improved film guide or raceway. It is a further object of the invention to provide a projecting apparatus including a novel means for advancing the film and an improved raceway film guide of rugged design capable of withstanding long usage and wear. It is a further object of the invention to provide a film guide raceway wherein the light aperture and slots, through which the film perforations are engaged, are widely spaced so that the raceway is not unduly weakened. It is also an object of the invention to provide as an article of manufacture an improved film guide raceway of rugged construction.

It is also an object of the invention to provide a film moving mechanism capable of progressing film that is torn, and which is capable of progressing film in either direction by pulling the film, rather than by pushing the film.

Other and further objects of the invention are those inherent in the apparatus herein illustrated, described and claimed.

The invention is illustrated with reference to the drawings in which

Figure 1 is a fragmentary front elevational view, partly in section, of a motion picture film and apparatus for progressing the same;

Figure 2 is a plan view, partly in section, taken along the line 2—2 of Figure 1;

Figures 3 and 4 are enlarged fragmentary front elevational views of the raceway of a film therein and the film progressing mechanism;

Figure 5 is a fragmentary side elevational view of a portion of the film feeding mechanism;

Figure 6 is an enlarged fragmentary view taken on line 6—6 of Figure 9 of the film guide raceway showing the clamping plate removed;

Figure 7 is a side view in section of a portion of the projector apparatus showing the film guide raceway and clamping plate and a portion of the lens mounting;

Figure 8 is a front elevational view of the film guide raceway removed from the remaining portions of the apparatus;

Figure 9 is an enlarged plan sectional view taken along the line 9—9 of Figure 6;

Figure 10 is a fragmentary sectional view taken along the line 10—10 of Figure 6;

Figure 11 is a front elevational view of the film removed from the raceway; and

Figure 12 is a front view of the film guide pressure plate.

Throughout the drawings corresponding numerals refer to the same parts.

Referring to the drawings Figure 1 illustrates a portion of the projector apparatus wherein a portion of the frame is illustrated generally at 10. Upon the frame there is mounted a supplemental frame generally designated 12 having a portion 13 which is screwed or riveted to the machine frame 10 and spaced upper and lower parallel arms 14 and 15, the latter serving as mountings for the pivot screws 16 and 17 which are threaded through the arms 14 and 15, respectively. The pivot screws support an oscillating frame generally designated 20 having upper and lower flange frame pieces 21 and 22, front and rear frame bars 23 and 24. The pivot screws 16 and 17 project into bearing blocks 26 and 27 and the frame 20 is therefore free to move in an oscillating motion back and forth as indicated by the arrows 28 and 29. The frame 20 is normally urged in the direction of arrow 28 by a U-shaped spring generally designated 30 having a bar piece 31 which is in contact with the side arms 33 and 34 of the frame piece 24. The spring extends around the headed posts 36 and 37 and the ends 39 and 40 are extended through apertures in the machine frame 10. The frame also includes a cam rider 41 which serves to oscillate the frame, as hereinafter described.

Upon the frame there are pivoted two arms 42 and 43, the arm 42 being pivoted at 44 to the side arm 33 of the frame and the arm 44 being pivoted at 45 to the side arm 34 of the frame. The arms extend in a direction parallel to the frame and are tied together at their extreme left end, as shown in Figure 1, by means of a link 47 which is pivoted to the arms at 48 and 49, as indicated in Figure 5. The link is provided with bent over claws 51 and 52 which are spaced apart so as to engage widely separated apertures 1 and 5 of the pairs of apertures in the film generally designated 55. The film moves through the raceway generally designated 56 which is of a configuration hereinafter described. The arm 42 is provided with a cam rider 54 and arm 43 is provided with a cam rider 53. The cam riders 53 and 54 are arranged to ride upon a cam surface 59 which is on shaft 60. The shaft 60 is driven by gear 61 and is rotatably supported in bearing blocks 62 and 63, the latter in turn being supported by frame members 64 and 65 attached to the machine frame generally designated 10.

The shaft 60 is also provided with a cam generally designated 67 which has a cam surface 68 upon which the cam follower 41 of the swing frame 20 is adapted to ride. The cam 67 is shaped so as to oscillate the swing frame 20 back and forth in the direction of arrows 28 and 29, one oscillation for each revolution of the shaft 60, and since the arms 42 and 43 are attached to the frame, the opposite end of the arms and the link 47, having claws 51 and 52 thereon, are all likewise moved in an oscillatory motion from a position out of engagement with the film perforations, to a position in engagement with the film perforations. The swing frame also includes a flat retaining member 32 which serves likewise to hold the arms 42 and 43 against the member 23 of the swing frame, the arms being free to slide vertically with reference to the swing frame.

The cam 59 which is also mounted so as to rotate with shaft 60 is shaped so as to impart to the cam followers 53 and 54, and hence to the arms 43 and 42, a vertical oscillatory motion in timed relation to the motion produced by cam 67. The extent of the vertical oscillatory motion of the arms 42 and 43 is sufficient to move the claws 51 and 52 a distance equal to the spacing between successive image frames on the film, plus a slight distance in addition, so that as the claws 51 and 52 are moved toward the film the leading claw (in the direction of film movement) will slightly clear the edge of the perforation. The trailing claw clears the edge of the perforation by a substantial distance, as hereinafter explained.

The details of the film progressing mechanism illustrated in Figures 1 and 2 form no part of the present invention and are more specifically described and claimed in my application entitled Tape moving mechanism, Ser. No. 545,626, filed of even date herewith, now United States Letters Patent No. 2,409,834 issued October 22, 1946, which is incorporated herein by reference. For the purpose of the present invention the entire film progressing mechanism may be substituted by any film progressing mechanism capable of advancing the film in a step-by-step motion a distance equal to the spacing between successive film frames, provided the film engaging claws are spaced apart a distance greater than adjacent film perforations, and spaced one above and one below the light aperture. Thus the film progressing mechanism shown opposite the bracket 70 of Figures 1 and 2 may be substituted by any other suitable mechanism.

Referring to Figures 1-5 it will be observed that the film 55 is provided with a plurality of successive image frames A, B, C, D, E and F and a plurality of film perforations 1, 2, 3, 4, 5 and 6, there being one perforation for each frame at the line between successive frames. It is to be understood, of course, that any system of perforation, whether at the lines separating the frames or otherwise, may be used. The usual film perforation is as illustrated herein. The film is guided by a guide generally designated 56 and is moved by the film progressing mechanism heretofore described due to the engagement of the claws 51 and 52 with apertures in the film.

It is a feature of the present invention that the selected perforations for progressing the film are spaced from each other more remotely than adjacent perforations. Thus, it will be observed that the claw 52 intercepts perforation 1 of any series of perforations, whereas claw 51 comes into the perforation 5 of said series. The claws 51 and 52 are spaced from each other a distance such that when claw 52 is in engagement with the marginal wall of perforation 1, claw 51 is located centrally within perforation 5. As illustrated in Figures 3 and 4 the claws 51 and 52 are spaced apart a distance greater than the center to center distance between the engaged perforations and the dimension of each claw in the direction of film movement is sufficiently less than the corresponding dimension of the associated perforation that both claws clear the film at the perforations when entering the latter. This is provided so that the film is drawn, rather than pushed, through the machine, the direction of normal film motion being downward, as illustrated by the arrow 71 of Figure 3. It occasionally happens that one or more film perforations may be torn out and in the usual film projecting apparatus this causes a stoppage of the film which can only be cleared by the operator opening the machine and progressing the film by hand a few frames and thereafter starting the machine. In the present apparatus the tearing out of as many as four perforations does not cause any stoppage of the film feed because in the event perforation 2, for example, should be torn out claw 52 in its oscillatory motion immediately following that shown in Figure 3, would not therefore engage perforation 2 which is assumed to be torn out and in this event claw 51 would engage perforation 6 and would push the film through the film guide raceway for as many frames as may be necessary to clear the torn perforations.

It is occasionally desirable, particularly in the projection of educational moving pictures to reverse the direction of film through the machine in order to permit a re-run of a selected portion of the film. For this purpose reverse running the film feeding mechanism of the present invention, having claws spaced apart a distance greater than adjacent apertures, permits a feed as illustrated in Figure 4 wherein the film is reversed as indicated by the direction of arrow 72. In Figure 4 the film 55 is about to be moved upwardly in the reverse direction, indicated by arrow 72 by the engagement of claw 51 with aperture 5 and in this instance claw 52 idles centrally within aperture 1. In Figures 3 and 4 the projection station is indicated by the dotted lines 74 which indicate the outline of the framing mask utilized in the projector.

Referring to Figures 6-10 there is illustrated the raceway for guiding the film. The raceway generally designated 80 is provided with smoothly curved ends 81 and 82 terminating in flat pieces 83 and 84 which are attached by suitable screws 85 and 86 to a portion of the machine frame 10. The raceway is preferably of stamped metal, although it may be machined or cast, and includes marginal side flats 87 and 88, as illustrated in Figures 9 and 10. The marginal edges of the flats lie in contact with suitable grooves 89 and 90 in the frame 10. Between the marginal flats 87 and 88 there is a recessed portion defined by walls 92 and 93, the recessed level being at 94. The flat area 94 has a width as indicated by bracket 95 and is coextensive with the edge of the film bearing the film perforations. Between wall 92 and the opposite edge of the flat portion 94 there is a further recessed portion 96 having a width as indicated by the bracket 97, this portion being coextensive with the film frames or of slightly greater width. A beading longitudinally of the film guide raceway is provided at 98 and has a level equal to that of the flat portion 94 and serves to support the film between the image frame and the sound track. Adjacent the beading 98 there is a further depressed area 99 indicated opposite the bracket 101, and there is provided a narrow marginal flat area 102 upon which the edge of the film adjacent the sound track slides. The distance between walls 92 and 93 is just slightly greater than the width of the film used in the apparatus and wall 93 is cut away at apertures 105 and 106 so as to permit the ends 107 and 108 of the spring 109 to ride against the edge of the film and thus force the film into sliding engagement with the opposite side wall 92 of the raceway. The spring 92 is supported by screws 119 on the frame member 10, as illustrated in Figures 6 and 10.

It will thus be observed that the film 55 slides in the raceway with its left edge, as illustrated in the drawings, in contact with the wall 92, urged there by the action of the tips of spring 107 which bear against the right edge of the film. The film does not contact the raceway except throughout the area indicated by the bracket 95, viz. the strip on which the film perforations occur together with a slight clearance on each side and along a narrow strip defined by the beading 98 and along a narrow edge defined by the flat 102 adjacent wall 93. Thus, the sound track, opposite the bracket 101, and the strip occupied by the film frames, indicated opposite the bracket 97, are not engaged by the raceway. The raceway depressions and beadings are blended off into the curves 81 and 82 at the end of the raceway and the film reaches the raceway more or less straight and out of engagement therewith.

Aside from the apertures 105 and 106 the raceway is provided with a light aperture 112 which is somewhat larger than the film frame being projected, inasmuch as the usual framing mask is provided. What is most important the raceway is provided with slots 114 and 115 which are removed longitudinally of the raceway, one above and one below the light aperture 112 and consequently there is no thin metal strip at 116 as is found in the usual film guide raceway. In the usual apparatus a slot is provided as indicated by the dotted line 117 (Figure 8) for passage into the raceway of the film feeding claw of the mechanism, and as a result there is a narrow metal bridge 116 (Figure 8) between the slot 117 and a light aperture 112. This seriously weakens the raceway and contributes to the wear of the raceway and the film moved through it. By utilizing a film feeding mechanism wherein the film feeding claws are spaced apart a greater distance than adjacent perforations and in which there are no claws to engage the perforations between such spaced apart perforations, it is possible to dispense with the raceway weakening slot 117. The positioning of slots 114 and 115, well above the light aperture 112, permits a sufficient amount of metal between them so that the raceway is not seriously weakened.

The film 55 is maintained in the raceway by means of a pressure plate generally designated 120 which is supported on the lens block generally designated 121 (Figure 7). The lens block is provided with a flange 122 having holes at 123 in which slide a pair of pins 124 that are solidly mounted on the back of the pressure plate. A pair of very light springs 126 are provided between the lens block flange 122 and the pressure plate 120 so as to urge the pressure plate against the film under very light pressure. The front of the pressure plate 120, with springs 126 removed, is illustrated in Figure 12 and it includes a light aperture 112', a pair of cut-outs 105' and 106' to permit clearance for tips 107 and 108 of spring 109 and a pair of slots 114' and 115' which are arranged so as to overlie the slots 114 and 115 of the film guide raceway. The pressure plate is provided with outwardly curved ends 127—127 and between the ends is shaped as indicated in Figure 10. Thus, it includes a flat surface opposite the bracket 95', a recessed area opposite the bracket 97', a longitudinal bead 98' and a narrow longitudinal recess opposite the bracket 101' and a marginal flat 102'. The shape of this part of the pressure plate is the enantiomorphic image of the shape of the film guide raceway as indicated by the cross sectional views of these parts shown in Figures 9 and 10.

As many apparently widely different embodiments of this invention may be made without departing from the spirit and scope thereof, it is to be understood that I do not limit myself to the specific embodiments herein except as defined by the appended claims.

What I claim is:

1. Apparatus for intermittently feeding a film having a succession of indicia bearing frames and a cooperating longitudinal series of equally spaced similar feed perforations past an exposure aperture comprising a claw feed mechanism having two fixedly spaced claws adapted to be disposed in non-adjacent perforations respectively above and below said exposure aperture when moving the film, and means for actuating said mechanism to successively insert said claws into said perforations, shift said claws in the desired direction of film movement for a distance slightly more than the longitudinal dimension of one of said frames, withdraw said claws from the film and then shift the claws in the opposite longitudinal direction to return them to starting position, the leading edges of said claws being spaced apart in the direction of film movement a distance slightly greater than the center to center distance between the engaged perforations, so that during the normal film advancing stroke of said mechanism the leading claw is in contact with the leading edge of its associated perforation to thereby pull the film positively past said exposure aperture and the trailing claw is free of contact with the leading edge of its associated perforation and so that when the claws are moved into engagement with the film to start each cycle of film feed the leading claw will slightly clear the leading edge of its associated perforation, and each of said claws having its dimension longitudinally of the film sufficiently less than the corresponding dimension of each perforation that both of said claws will clear the trailing edges of said associated perforations when moved into engagement with the film.

2. Apparatus for reversibly intermittently feeding a film strip having a succession of indicia bearing frames and a cooperating longitudinal series of equally spaced similar feed perforations past an exposure aperture comprising a claw feed mechanism having two fixedly spaced claws adapted to be disposed in non-adjacent perforations respectively above and below said exposure aperture when moving the film, and means for actuating said mechanism to successively insert said claws into said perforations, shift said claws in the desired direction of film movement for a distance slightly more than the longitudinal dimension of one of said frames, withdraw said claws from the film and then shift said claws in the opposite longitudinal direction to return them to starting position, the leading edges of said claws being spaced apart in the direction of movement of the film a distance slightly greater than the center to center distance between the engaged perforations, so that during the normal film advancing stroke of said mechanism in either direction the leading claw is in contact with the leading edge of its associated perforation to thereby pull the film positively past said exposure aperture and the trailing claw is free of contact with the leading edge of its associated perforation and so that when the claws are moved into engagement with the film to start each cycle of film feed the leading claw will clear the leading edge of its associated perforation, and each of said claws having its dimension longitudinally of the film sufficiently less than the corresponding dimension of each perforation that both of said claws will clear the trailing edges of said associated perforations when the claws are moved into engagement with the film.

ROY A. CLAPP.

REFERENCES CITED

The following references are of record in the file of this patent:

UNITED STATES PATENTS

| Number | Name | Date |
|---|---|---|
| 1,357,983 | Hunt | Nov. 9, 1920 |
| 1,473,465 | Clark | Nov. 6, 1923 |
| 1,780,945 | Sapier | Nov. 11, 1930 |
| 1,825,254 | Victor | Sept. 29, 1931 |
| 1,828,768 | Dina | Oct. 27, 1931 |
| 1,918,569 | Sapiro | July 18, 1933 |
| 2,106,115 | Debrie | Jan. 18, 1938 |
| 2,168,941 | Marks | Aug. 8, 1939 |
| 2,281,726 | Stechbart | May 5, 1942 |
| 2,361,291 | Howell | Oct. 24, 1944 |

FOREIGN PATENTS

| Number | Country | Date |
|---|---|---|
| 319,644 | Great Britain | Sept. 25, 1929 |
| 7,003 | Australia | Apr. 18, 1932 |
| 340,340 | Germany | Sept. 8, 1921 |